United States Patent [19]

Cloutier et al.

[11] Patent Number: 5,555,407
[45] Date of Patent: Sep. 10, 1996

[54] METHOD OF AND APPARATUS FOR REDUCTION OF BANDWIDTH REQUIREMENTS IN THE PROVISION OF ELECTRONIC INFORMATION AND TRANSACTION SERVICES THROUGH COMMUNICATION NETWORKS

[75] Inventors: Jean-Francois Cloutier, North Tarrytown; Oleg Arsky, Shenorock, both of N.Y.; Nikolas Boyd, Los Angeles, Calif.; Rosemary Rush, New York, N.Y.

[73] Assignee: Home Information Services, Inc., New York, N.Y.

[21] Appl. No.: 143,018

[22] Filed: Oct. 29, 1993

Related U.S. Application Data

[63] Continuation-in-part of Ser. No. 19,111, Feb. 17, 1993, abandoned.

[51] Int. Cl.$^6$ ..................................................... G06F 17/30
[52] U.S. Cl. ..................... 395/600; 364/282.4; 364/569; 364/974.2; 364/DIG. 1
[58] Field of Search ..................................... 395/600, 200; 364/282.4, 569, 974.2

[56] References Cited

U.S. PATENT DOCUMENTS

| 4,432,057 | 2/1984 | Daniell et al. | 395/600 |
| 5,307,456 | 4/1994 | MacKay | 395/154 |
| 5,333,316 | 7/1994 | Champagne et al. | 395/600 |
| 5,388,255 | 2/1995 | Pytlik et al. | 395/600 |

OTHER PUBLICATIONS

Stumm et al., "Algorithms Implementing Distributed Shared Memory" *Computer*, vol. 23, No. 5, pp. 54–64, May 1990.

*Primary Examiner*—Thomas G. Black
*Assistant Examiner*—Hosain T. Alam
*Attorney, Agent, or Firm*—Lowe, Price, LeBlanc & Becker

[57] ABSTRACT

A multimedia system for providing electronic information and transaction services that combines shared remote access to a utility database with local access to a local database. When information access is requested from an interactive multimedia player provided with the local database and coupled through a telecommunication network to the utility database, the information is first searched in the local database. If it is not found there, the request is forwarded to the utility database over the telecommunication network. Each data element is associated with a defined life span that determines an interval between the data element activation and deactivation.

11 Claims, 7 Drawing Sheets

| n | Data Element F |
|---|---|
| n + 1 | Data Element B |
| N + 2 | -> n + 4 |
| n + 3 | Data Element T |
| n + 4 | -> n + 11 |
| n + 10 | Data Element D |
| n = 11 | Data Element A |
| <empty> | <empty> |

| DATA ELEMENT | DATA OF ACTIVATION | TIME OF ACTIVATION | DATE OF DEACTIVATION | TIME OF DEACTIVATION |
|---|---|---|---|---|
| | | | | |

| | |
|---|---|
| n | Data Element F |
| n + 1 | Data Element B |
| N + 2 | -> n + 4 |
| n + 3 | Data Element T |
| n + 4 | -> n + 11 |
| n + 10 | Data Element D |
| n = 11 | Data Element A |
| <empty> | <empty> |

Figure 4

METHOD OF AND APPARATUS FOR REDUCTION OF BANDWIDTH REQUIREMENTS IN THE PROVISION OF ELECTRONIC INFORMATION AND TRANSACTION SERVICES THROUGH COMMUNICATION NETWORKS

CROSS REFERENCE TO RELATED APPLICATION

This application is a Continuation-In-Part of our application Ser. No. 08/019,111 filed Feb. 17, 1993, now abandoned.

TECHNICAL FIELD

The present invention relates generally to electronic transaction and information services provided through a telecommunication network, and more particularly to a method of and system for providing electronic transaction and information services that incorporate a local database interacting with a large remote database for providing a user with multimedia data.

BACKGROUND ART

Electronic transaction and information services (hereafter referred to as electronic services) are provided either by giving users shared access through some communication network to a database, or by supplying to each user a copy of a database (on a diskette, CD-ROM etc.) which is then accessed locally. User interactions and information display are realized through a computing device with appropriate display capabilities. Shared databases can change dynamically and these changes are then made rapidly available to the users. Published databases do not change between publications. Changes to the source database(s) are made available to users only upon publication of updates.

A principal advantage of a publication approach to electronic services compared to a shared database is its low-cost, mastering and mailing a CD-ROM or diskette being relatively inexpensive. Furthermore, publication removes the telecommunication network bandwidth constraint for broadband information access, such as multimedia, since no remote access is required.

The shared access approach, on the other hand, enables multiple users to share the same information space and thus interact with each other, together with the opportunity to provide electronic transaction services. Unlike local, static database systems, shared database systems can offer current and up-to-date information. Volatile types of information, such as stock prices or news services, are usually provided through shared access.

With the advent of low-cost computing devices capable of manipulating digitized movies, sounds and images, it has become very desirable to use these capabilities in electronic services implementing multimedia data transmission. Because of the possibly very large size of each chunk of multimedia content, timely transmission requires high bandwidth networks. Electronics services using multimedia content are currently provided through the publication of CD-ROMs.

Timeliness of transmission depends on the intended usage of the data. For example, digital teleconferencing requires the transmission and reception of more than 10 video frames per second in addition to the synchronous transmission of digitized sound. Transmission of still picture requested by an on line user, on the other hand, should be delivered within a few seconds.

POTS service has a maximum bandwidth of 64 Kbaud. This low bandwidth currently prohibits electronic service providers from providing multimedia content. The POTS is and for the next few years will be the only ubiquitous, low-cost, point-to-point telecommunication network. Providers of electronic services accessed through POTS must currently restrict themselves to the delivery of data with low bandwidth requirements, such as plain text or low resolution vector-encoded graphics.

Low-cost, high-capacity secondary storage technologies are evolving rapidly, spurring the growth of the multimedia computing market. CD-ROM technologies currently provide the cheapest medium on which to store large quantities of data. Large capacity storage devices (>100 megabytes per device) are necessary to accommodate the space requirements of digitized video, sound and images. A number of standards for CD-ROM formats exist such as Phillips' CD-I.

Recently, attention has moved to the compression, transmission and decompression of multimedia content (digitized video, pictures and sounds). Specialized algorithms (JPEG, streaming-JPEG, MPEG etc.) have been devised to reduce size prior to transmission and to recreate multimedia content on the delivery site with more or less information loss incurred in the process. These algorithms are realized both in software and hardware. Network technology is rapidly evolving to address the high-bandwidth requirement of interactive multimedia. Network bandwidth is expanded by a combination of improved transport capabilities (fiber optics, ISDN, etc.) and more efficient information routing protocols (ATM, FDDI etc.).

Whereas data compression and real-time data decompression can reduce bandwidth requirements on a network by a factor up to 50, this may not be enough to sustain interactivity with multimedia content transmitted over low bandwidth networks.

An economical solution allowing interactive access over the existing POTS to electronic services rich in multimedia content would help expand the mass appeal of these services. The current solution is for electronic service providers to wait for ISDN or other high-bandwidth communication network to reach a sufficiently large portion of the population before adding multimedia content and capabilities to their services.

Videotext services have, for many years, used the POTS to transmit text and vector-encoded graphics to personal computers and public information displays. A considerable amount of work has gone into fully specifying graphic images with a minimal amount of information in order to achieve low-cost transmission and efficient decoding and reconstruction at the site of delivery. The NAPLPS (the North American Presentation Level Protocol Standard) videotext format is a widely used example. The Prodigy™ service uses NAPLPS. Videotext technology does not address multimedia content.

In view of the above, it would be desirable to reduce the bandwidth requirements to a telecommunication network for providing interactive electronic services with multimedia content.

Also, it would be desirable to provide a low-cost multimedia system for electronic services through a low-bandwidth network.

DISCLOSURE OF THE INVENTION

Accordingly, one advantage of the invention is in reducing the bandwidth requirements to a telecommunication network for providing electronic services with multimedia content in order to allow multimedia data to be accessed through low-bandwidth communication networks.

Another advantage of the invention is in providing a low-cost multimedia system for electronic services through a low-bandwidth network.

The above and other advantages of the invention are achieved, at least in part, by providing a system for enabling data to be accessed through a telecommunication network that comprises a host data processor and a source of central data elements at a central location, and a local terminal coupled to the host data processor through the telecommunication network.

In accordance with one aspect of the present invention, the local terminal includes a local computer and a local database accessible by the local computer for storing local data elements corresponding to the central data elements and updatable in accordance with the corresponding central data elements. Preferably, the central and local data elements represent multimedia information with most if not all of the multimedia information accessed locally to reduce transmission cost.

In the preferred embodiment of the invention, the source of central data elements stores central lifetime tags associated with the central data elements and identifying time between activation and deactivation of the central data elements. The local database stores local lifetime tags associated with the local data elements and identifying time between activation and deactivation of the local data elements. The host data processor compares central and local lifetime tags of corresponding central and local data elements to determine inconsistent local data element. The local computer stores inconsistent data element pointers that identify the inconsistent local data elements.

In accordance with the method of this invention, the data are enabled to be accessed through a telecommunication network using a central database and a local database located at a remote location and coupled to the central database through the telecommunication network. The following steps are carried out:

a) storing, in a central database, central data elements;

b) storing in a local database, local data elements corresponding to the central data elements and updatable in accordance with the corresponding central data elements;

c) comparing the local data elements with the central data elements to determine a list of inconsistent local data elements;

d) sending a request to the central database from the remote location for a required data element;

e) searching the list of inconsistent local data elements for the required data element;

f) if the required data element is not found to be inconsistent, searching the local database for the required data element; and g) if the required data element is found to be inconsistent, searching the central database for the required data element.

The method preferably is practiced in the multimedia data environment and may further comprises the steps of:

storing, in the central database, central lifetime tags associated with the central data elements and identifying time intervals between activation and deactivation of the central data elements; and storing, in the local database, local lifetime tags associated with the local data elements and identifying time intervals between activation and deactivation of the local data elements.

The step of comparing more particularly may include comparing the central and local lifetime tags of the corresponding central and local data elements to determine whether or not the time intervals identified by the local lifetime tags are within the time intervals identified by the corresponding central lifetime tags.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 4 is a diagram illustrating an addressing scheme used in the present invention.

BEST MODE FOR CARRYING OUT THE INVENTION

Figure 1:
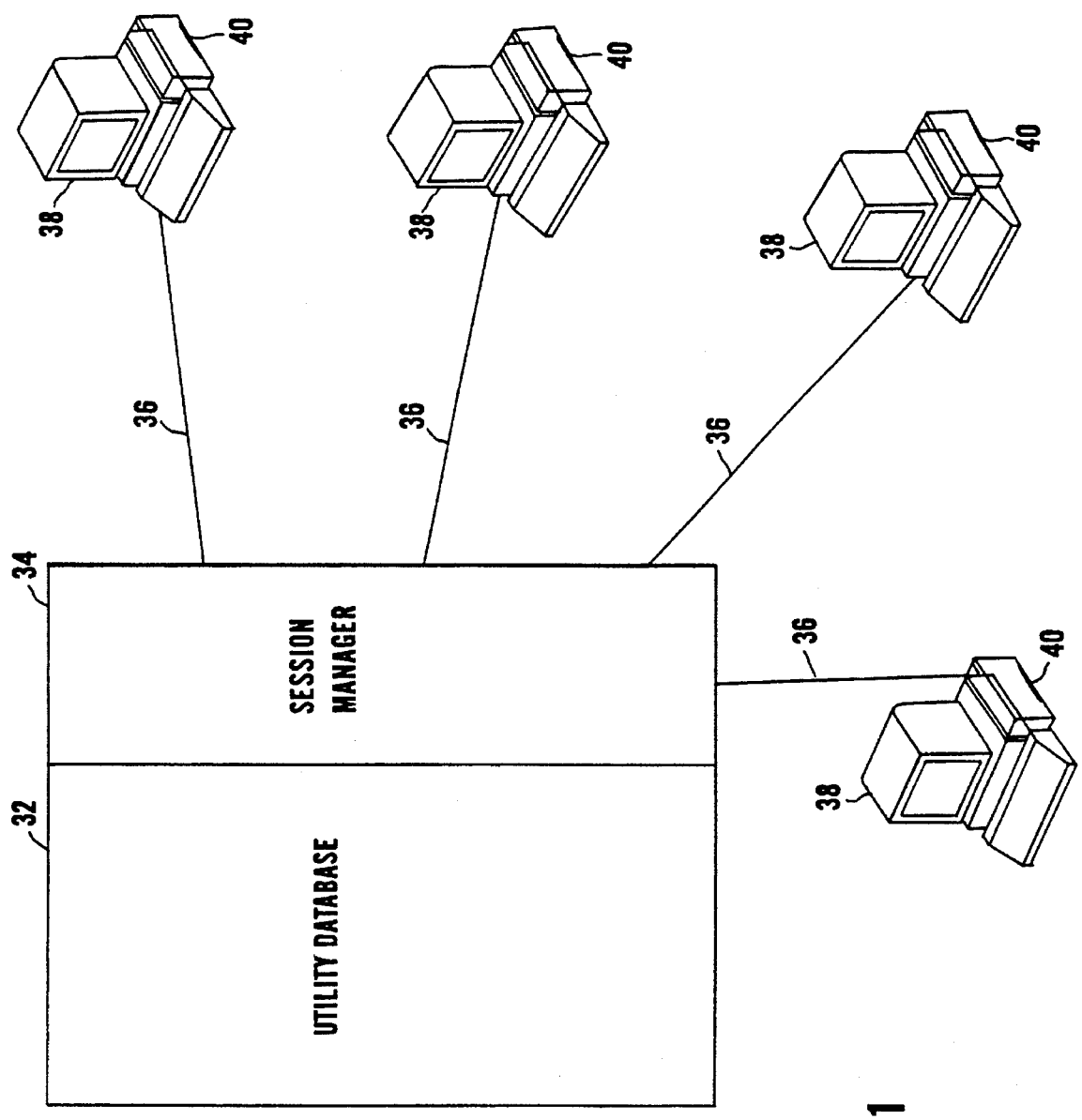
FIG. 1 is a simplified block diagram of a multimedia system for providing electronic services in accordance with the present invention.

Reference is now made to FIG. 1 showing a simplified block-diagram of a multimedia system for providing electronic services according to the present invention. The system comprises a utility database 32 at a centralized location which stores a collection of information and services represented by multimedia data elements in a large plurality of formats, for example alphanumeric, digitized video and sound, graphical, etc. The utility database 32 is coupled to a host data processor 34 acting as a session manager to control access to the utility database by a plurality of remote users. Each user's terminal coupled to the session manager through a telecommunication network 36 comprises an interactive multimedia player (IMP) 38, which is a multimedia capable computing and display device disclosed in more detail in our copending application entitled "METHOD AND APPARATUS FOR INTERACTING WITH ELECTRONIC INFORMATION AND TRANSACTION SERVICES USING A VISUAL DISPLAY AND REMOTE CONTROL," incorporated herein by reference. The IMP 38 is provided with a local database 40 on a Compact Disc-Read Only Memory (CD-ROM), which acts as a pretransmitted subset of the remote utility database 32. For example, the CD-ROM may store a periodically updated publication which comprises data elements representing all or part of the information and services available in the utility database 32. Alternatively, the local database 40 may be updatable through the communication network 36 by the host data processor 34 interacting with the utility database 32. In this case, the data elements available in the utility database are periodically sent to the local database through the communication network. The same database organization is shared by both the CD-ROM and utility database. Each publication is uniquely identified by a publication identifier stored by each CD-ROM. Every data element of the CD-ROM also exists in the utility database; however the data elements that would change between two successive publications of a CD-ROM, may be available only in the utility database.

Figures 2, 2A:
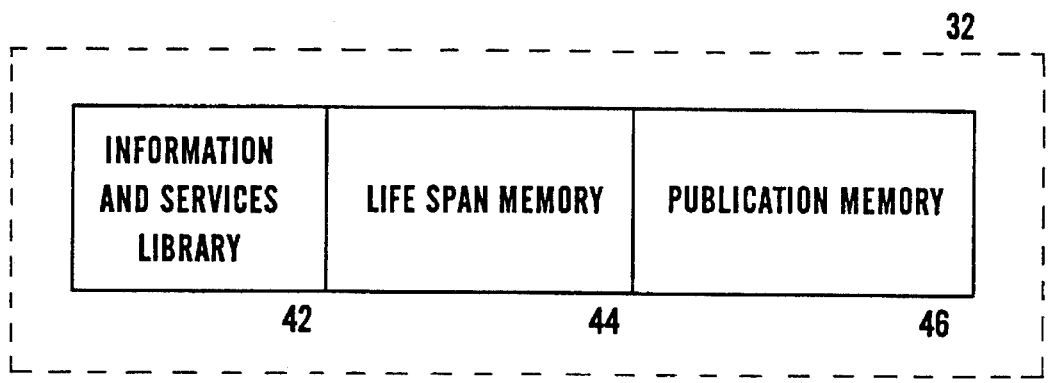
FIG. 2 is a diagram illustrating the structure of the Utility Database shown in FIG. 1.
FIG. 2a is a diagram illustrating the structure of a life span tag associated with each data element of the utility database.

As shown in FIG. 2, the utility database comprises an information and services library 42 that stores multimedia data elements representing information and services to be accessed by the remote users. Each service may be represented by a software program defined by a data element or by a combination of data elements, all of which are individually identifiable. As shown in FIG. 2a, each data element is associated with a life span tag stored in a life span memory 44. The life span defined by this tag determines when the corresponding data element effectively begins to exist and when it ceases to exist. Each life span tag may comprise fields indicating a date and time of activation and/or deactivation of the associated data element, if it is deactivated. Further, the utility database 32 comprises a publication memory 46 that stores a record of each publication on the CD-ROM, its identifier and the data elements it contains.

Figure 3:
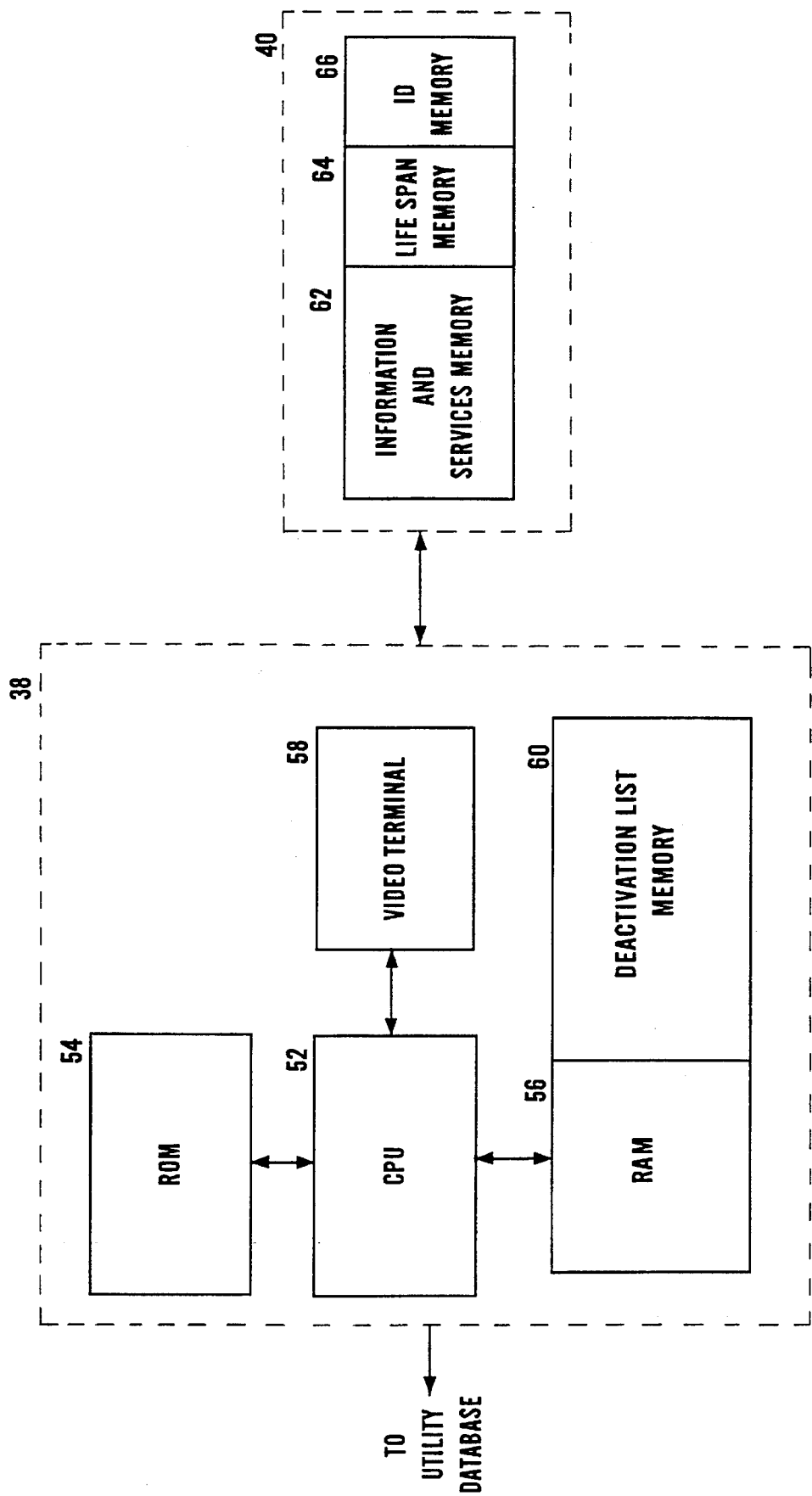
FIG. 3 a diagram illustrating the structure of the Interactive Multimedia Player and CD-ROM shown in FIG. 1.

Referring to FIG. 3, each IMP 38 comprises a CPU 52 provided with a ROM 54 and a RAM 56. The CPU interacts with a video terminal 58 to display the data elements read either from the utility database or CD-ROM based on information stored in a deactivation list memory 60. As will be described in more detail later, the deactivation list memory 60 stores a list of inconsistent data elements that are contained in the publication to be accessed.

As shown in FIG. 3, each IMP 38 is provided with a local database 40 on a CD-ROM. The IMP may interact with the CD-ROM using a conventional CD-ROM drive (not shown). As indicated above, each CD-ROM 40 may contain a periodically updatable publication representing data elements available in the utility database. The data elements are stored in an information and services memory 62 region of the CD-ROM. Like the data elements in the utility database shown in FIG. 2a, each of the data elements stored in the information and services memory 62 is associated with a life span tag stored in a life span memory 64 and defining an interval between activation and deactivation of the associated data element. The life span tag may comprise a date and time of the data element activation and/or deactivation, if it is deactivated.

The life span of a data element in a CD-ROM may differ from the life span of the corresponding data element in the utility database. However, the interval between activation and deactivation of the CD-ROM data element must be within the interval between activation and deactivation of the corresponding data element in the utility database, in order to make the corresponding data elements consistent with each other. A data element is considered to be active if the moment of access falls within its defined life span. Each CD-ROM contains in an ID memory 66 its unique publication identifier, which enables the host data processor 34 to check the CD-ROM data elements.

Reference is now made to FIG. 4 illustrating the addressing scheme used to identify data element location in the utility and local databases. Each data element is uniquely identified by a logical pointer, which may be a numerical index or some other means of identification. For example, the address of data element F shown in FIG. 4 is indicated by the pointer n. Data element B is identified by the address (n+1). A logical pointer is never reused through the entire lifetime of the system. When a data element is altered, it is given a new pointer that indicates the address of its new storage location. The previous instance at the location identified by the old pointer is replaced by a copy of its new logical pointer.

For example, the data element A shown in FIG. 4 initially was stored at the location indicated by the pointer (n+2). Then, it was changed and rewritten into the location indicated by the pointer (n+4). Accordingly, the copy of the new pointer (n+4) is written into the location (n+2). Then, the data element A was changed again. While the modified data element A is written into the new location identified by the pointer (n+11), the copy of its new pointer (n+11) replaces the previous data element A in the location (n+4). Thus, the system creates a pointer chain that allows a data element to be traced from the initial location to the latest one.

In the utility database, due to deletions of data elements, a gap may exist between two successive storage locations. For example, such a gap is shown in FIG. 4 between the locations (n+4) and (n+10). In the local database, a gap between storage locations may be caused by unpublished data elements.

When a data element is changed in the utility database (its content or life span is changed), then the corresponding data element in a publication (on CD-ROM) contained in a local database has become inconsistent with the data element of utility database. Alternatively, if a data element is deleted from the utility database, then a publication in a local database that comprises the data element corresponding to the deleted data also has become inconsistent with the utility database. The utility database maintains a list of all such published data elements which have been altered. The structure of this list will be described in more detail later.

Figure 5A:
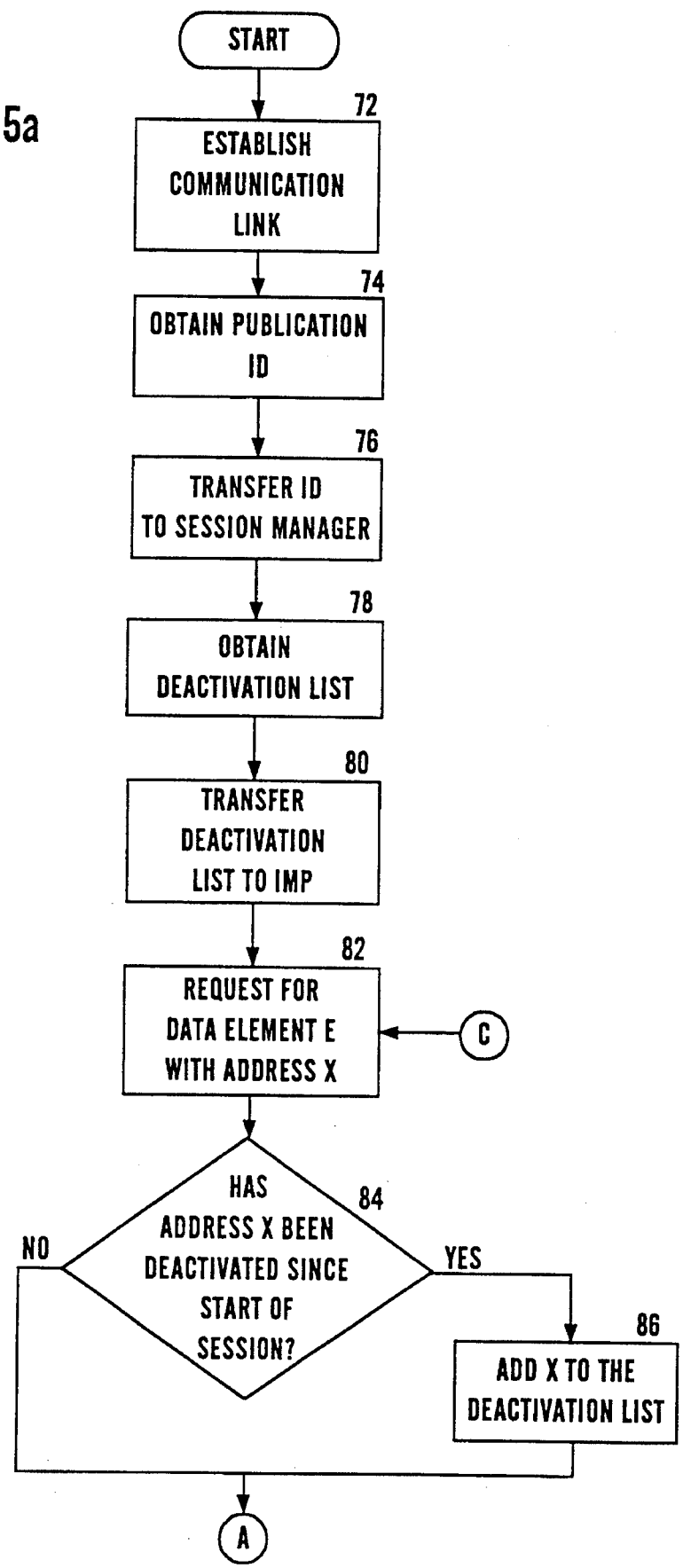
FIGS. 5a–5c show a flow-chart illustrating operation of the multimedia system for providing electronic services.
Figure 5B:
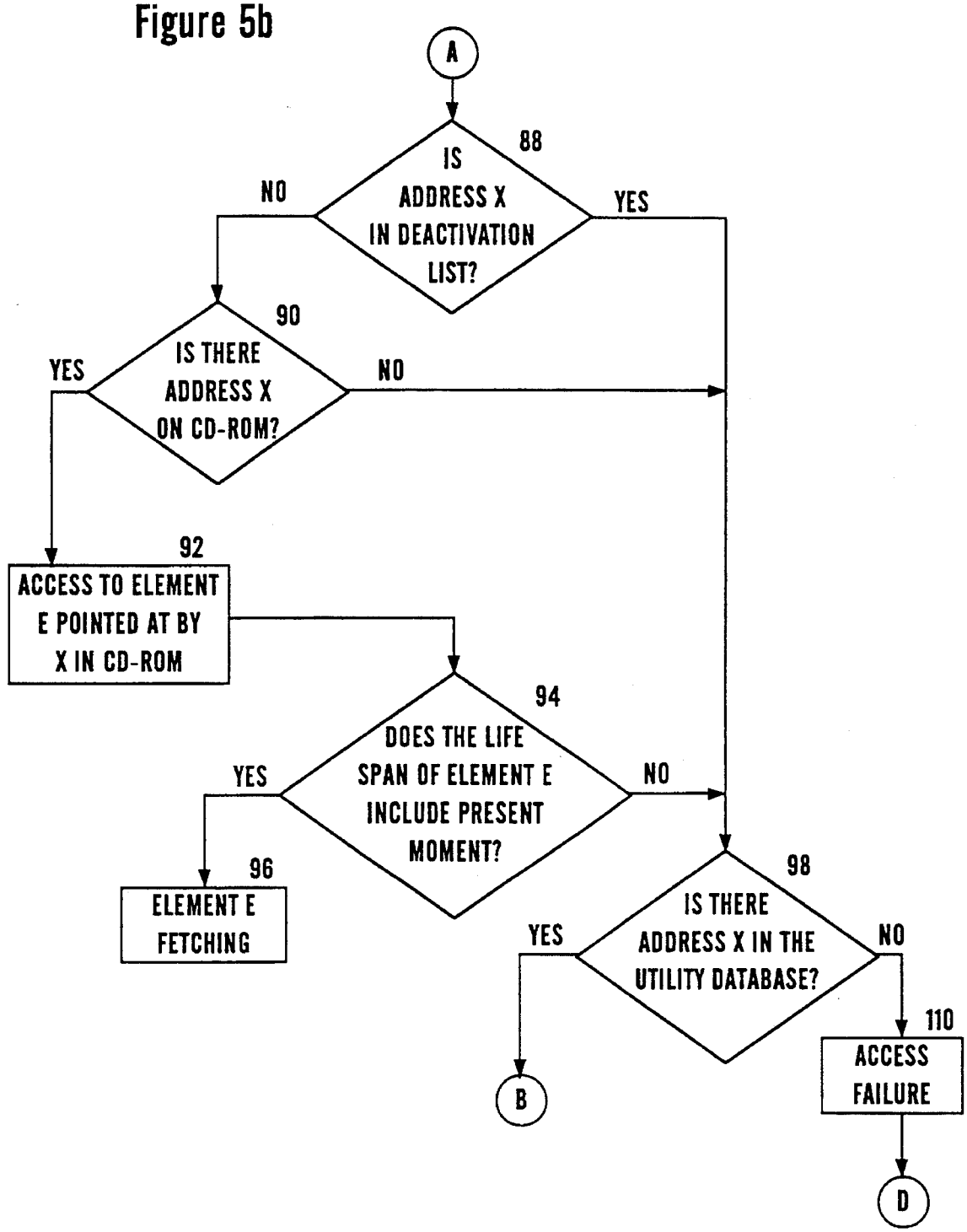
Figure 5C:
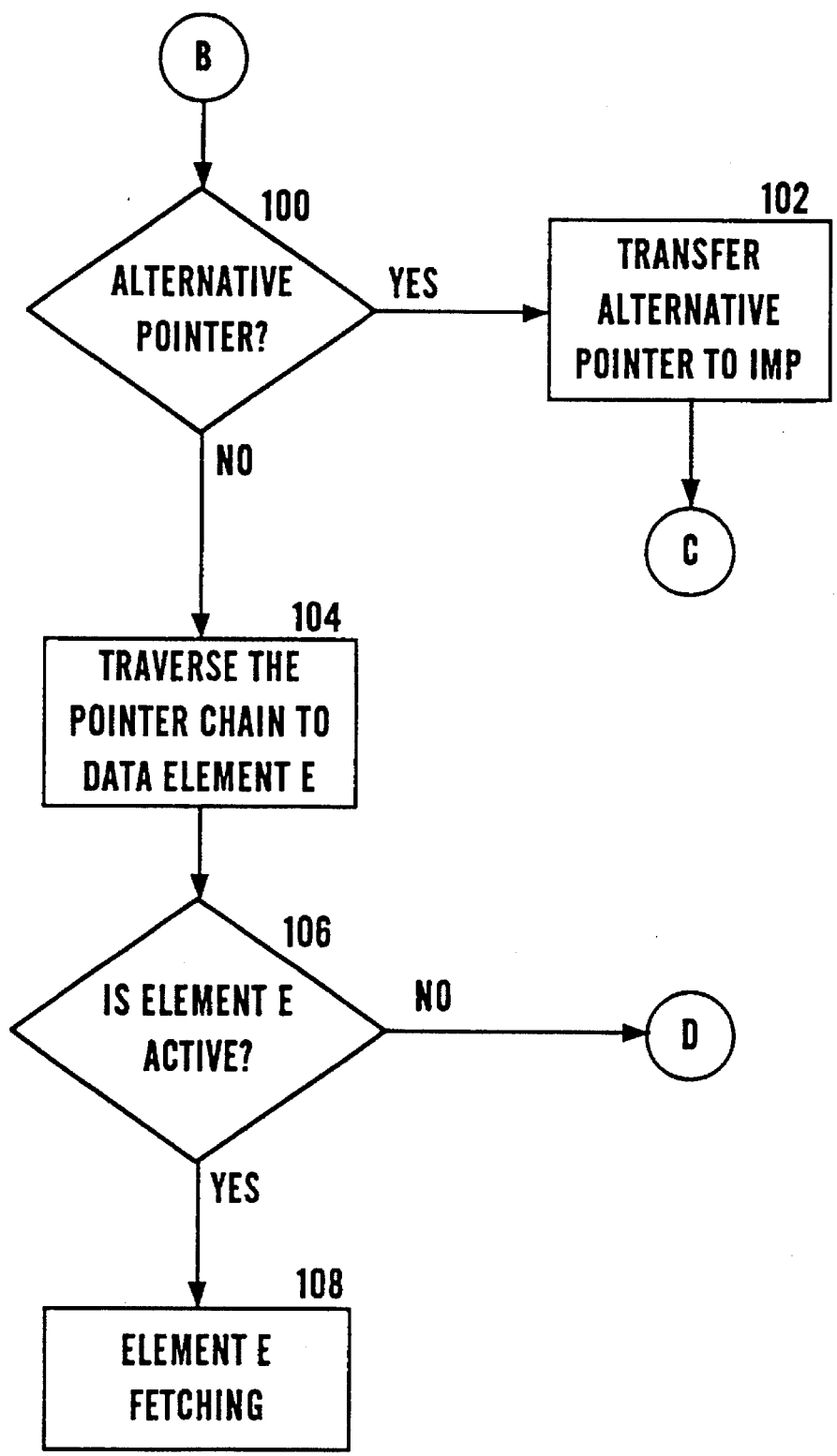

The operation of the system for providing electronic services is as follows. A session that enables a user of a remote IMP 38 to gain access to multimedia data comprises three consecutive stages: creation, interaction and termination. Referring to FIGS. 5a–5c, the session is created by the session manager 34 when the IMP 38, under control of an application program, establishes a communication link with the utility database 32 (block 72). The IMP reads the publication identifier of the CD-ROM stored in the ID memory (block 74). Then, at block 76, the publication identifier is transmitted to the session manager 34.

As discussed above, when the content of a data element is changed in the utility database, or a data element is deleted from the utility database, the corresponding data element in a publication (on CD-ROM) contained in a local database is considered to be inconsistent.

When the defined life span of a data element is altered, the host data processor uses the publication data elements with associated life span tags stored in the publication memory 46 to compare the new life span tag of the data element which has been altered with the life span tag of the corresponding publication (CD-ROM) data element. The publication data element is considered to be inconsistent when its life span falls outside the new life span of the corresponding data element in the utility database. The utility database maintains a list of all inconsistent data elements in all of the publications. This list is stored in the publication memory 46.

When the session manager 34 receives the publication identifier, it obtains a list of inconsistent data elements for the publication available in the requesting user's terminal (block 78) and transmits this list, which will be hereafter referred to as the Deactivation List, to the IMP 38 (block 80). The Deactivation list represents the logical pointers indicating the addresses of the inconsistent data elements on the CD-ROM available in the user's terminal. For example, if the data elements T and D shown in FIG. 4 are deactivated in the utility database, but are available on the CO-ROM, the Deactivation list comprises the pointers (n+3) and (n+10) corresponding to the inconsistent data elements T and D. This list is stored in the Deactivation list memory 60 of the IMP at least during the session.

After receiving the Deactivation list, the IMP proceeds to the interactive stage of the session and allows the user to interact with the utility and local databases. As a consequence of user interactions, request for a data element is made by the IMP in the block 82. A request contains a logical pointer to a data element. For example, a element E pointed at by a logical pointer (address) X may be requested, as shown in FIG. 5a.

In block 84 the utility database is asked if the pointer X has been deactivated since the beginning of the session. If so, the pointer X is added to the Deactivation list (block 86). Other similarly deactivated pointers may be also transmitted at that time to the IMP. The session manager preferably informs the IMP of the deactivated pointers immediately without prompting in an interrupt-driven fashion. However, a polling approach is also possible.

If the pointer X has not been deactivated since the beginning of the session or is added to the Deactivation list, the program checks, at block 88, (FIG. 5b) whether or not the pointer X is in the Deactivation list. If not, the program checks, at block 90, whether or not the address X exists on the CD-ROM. If so, the system provides access to the data element E pointed at by the pointer X on the CD-ROM (block 92). First of all, at block 94, the program checks whether or not the life span of the data element E includes the present moment. If so, the data element E is fetched from the CD-ROM and used by the IMP.

If address X is found in the Deactivation list, the address X is not available on the CD-ROM, or the life span of the data element E pointed at by the address X does not include the present moment, the program proceeds to block 98 to determine whether or not the address X is available in the utility database 32. The utility database receives, through the communication link 36, the pointer X with a request to return the associated data element E. If the utility database contains the pointer X, the system checks at block 100 of FIG. 5c whether or not the element E may be accessed through an alternative pointer on the CD-ROM. If so, the alternative pointer is sent at block 102 to the IMP, and the system returns to block 82 of FIG. 5a to request access to the data element pointed at by the alternative pointer. If no alternative pointer is available, at block 104 the program traverses the pointer chain that leads to the data element E and examines its life span tag at block 106 to check whether or not the data element E is still active. If so, the element E is fetched from the utility database at block 108, sent through the communication link 36 to the IMP and used there. If the address X is not available even in the utility database, or the element E pointed at by the address X is not active, the system sends an access failure message to the user (block 110).

To reduce the number of transmissions, the access requests and responses may be batched. Further, the data elements transmitted from the utility database may be cached by a buffer memory of the IMP. The system may anticipate the access requests and transmit unrequested data elements when the communication line is idle. To prevent unacceptable performance degradation, when a significant amount of the CD-ROM data elements are inconsistent, the system may replace transmission of broad bandwidth data elements of the utility database, such as video sequences, with transmission of the equivalents requiring more narrow bandwidth, for example, text narratives or graphics-based animations.

There accordingly has been described a multimedia system for providing electronic information and transaction services that combines shared remote access to a utility database with local access to a local database. When information access is requested from an interactive multimedia player, the information is first searched in the local database. If it is not found there, the request is forwarded to the utility database over a telecommunication network. Each data element is associated with a defined life span that determines an interval between the data element activation and deactivation. Accordingly, the bandwidth requirements to the system can be reduced.

In this disclosure, there is shown and described only the preferred embodiment of the invention, but it is to be understood that the invention is capable of changes and modifications within the scope of the inventive concept as expressed herein.

We claim:

1. A system for providing access to data through telecommunication network, comprising:

a host data processor and a source of central data elements at central location; and a local terminal coupled to said host data processor through said telecommunication network and including
a local computer, and
a local database accessible by said local computer for storing local data elements corresponding to said central data elements and automatically updatable by said host data processor in accordance with said corresponding central data elements, wherein said source of central data elements stores central lifetime tags associated with the central data elements and identifying time between activation and deactivation of said central data elements, and said local database stores local lifetime tags associated with said local data elements and identifying time between activation and deactivation of said local data elements, said host data processor compares central and local lifetime tags of corresponding central and local data elements to identify any inconsistent local data elements, and said local computer is responsive to said comparison for storing inconsistent data element pointers for identifying said inconsistent local data elements.

2. The system of claim 1, wherein said source of central data elements and said local database store multimedia data.

3. The system of claim 1, wherein said local terminal comprises a personal computer equipped with a CD-ROM memory.

4. A method for providing access to data through a telecommunication network using a central database and a local database located at a remote location and coupled to the central database through the telecommunication network, said method including the steps of:

a) in said central database, storing central data elements;

b) in said local database, storing said local data elements corresponding to said central data elements and updatable in accordance with the corresponding central data elements;

c) comparing said local data elements with said central data elements to formulate a list of inconsistent local data elements;

d) sending a request from the remote location to said central database for a required data element, and determining whether or not the required data element is deactivated;

e) searching said list of inconsistent local data elements for the required data element;

f) if the required data element is not found to be inconsistent, searching said local database for the required data element; and g) if the required data element is found to be inconsistent, searching said central database for the required data element.

5. The method of claim 4, further including the steps of:

in said central database, storing central lifetime tags associated with said central data elements and identifying time intervals between activation and deactivation of said central data elements; and in said local database, storing local lifetime tags associated with said local data elements and identifying time intervals between activation and deactivation of said local data elements.

6. The method of claim 5, wherein said step of comparing includes the step of comparing said central and local lifetime tags of the corresponding central and local data elements to determine whether or not the time intervals identified by the local lifetime tags are within the time intervals identified by the corresponding central lifetime tags.

7. The method of claim 6, further including determining whether or not the lifetime tag of the required data element encompasses a current moment.

8. The method of claim 4, wherein said steps (a) and (b) include the steps of storing multimedia data in said central and local databases, and said step (d) includes the step of requesting the multimedia data.

9. The method of claim 4, wherein said central data elements are periodically sent from said central database to said local database to update said local data elements.

10. The method of claim 9, wherein said central data elements are sent through said telecommunication network.

11. A method for providing access to data through a telecommunication network using a central database and a local database located at a remote location and coupled to the central database through the telecommunication network, said method including the steps of:

a) in said central database, storing central data elements;

b) in said local database, storing said local data elements corresponding to said central data elements and updatable in accordance with the corresponding central data elements;

c) comparing said local data elements with said central data element to formulate a list of inconsistent local data elements;

d) sending a request from the remote location to said central database for a required data element;

e) determining whether or not the required data element is deactivated, f) adding to the list of inconsistent local data elements the element deactivated after the request;

g) searching said list of inconsistent local data elements for the required data element;

h) if the required data element is not found to be inconsistent, searching said local database for the required data element; and i) if the required data element is found to be inconsistent, searching said central database for the required data element.

* * * * *